United States Patent [19]

Aoki

[11] Patent Number: 5,327,154
[45] Date of Patent: * Jul. 5, 1994

[54] INDICATION DISPLAY UNIT FOR VEHICLES

[75] Inventor: Kunimitsu Aoki, Susono, Japan

[73] Assignee: Yazaki Corporation, Tokyo, Japan

[*] Notice: The portion of the term of this patent subsequent to May 16, 2006 has been disclaimed.

[21] Appl. No.: 724,454

[22] Filed: Jul. 3, 1991

Related U.S. Application Data

[63] Continuation of Ser. No. 262,376, Oct. 25, 1988, abandoned.

[30] Foreign Application Priority Data

Oct. 26, 1987 [JP] Japan .................. 62-268140

[51] Int. Cl.$^5$ .................................................. G09G 3/02
[52] U.S. Cl. .................................. 345/7; 353/13
[58] Field of Search .......... 340/705, 784, 980; 353/13, 14; 358/93, 103, 104, 241; 345/7, 8

[56] References Cited

U.S. PATENT DOCUMENTS 4,562,433 12/1985 Biferno .................. 340/784
4,742,389 5/1988 Schiffman .................. 340/705
4,791,418 12/1988 Kawahora et al. .................. 340/784
4,818,980 4/1989 Strosser et al. .................. 340/784
4,831,366 5/1989 Iino .................. 340/980

FOREIGN PATENT DOCUMENTS 0041200 4/1978 Japan .................. 340/984
60-205794 10/1985 Japan .

OTHER PUBLICATIONS

M. N. Ernstoff, "Liquid Crystal Pictorial Display", Nov. 1975; Info-Mania Conference, USA; pp. 28–36.

Primary Examiner—Ulysses Weldon
Assistant Examiner—M. Fatahiyar
Attorney, Agent, or Firm—Armstrong, Westerman, Hattori, McLeland & Naughton

[57] ABSTRACT

An indication display unit which includes an LC board as its reflector, by the reflector's changing of its transmissivity, the reflected image thereon projected from an indication projector and other images, such as an image directly exposed from an indicator located behind the LC board or the image generated by itself, can be respectively selected to be reflected therefrom. Accordingly, with the indication display of this invention, the clarity of the displayed image can be greatly improved, and simultaneous display of various indications can be achieved.

6 Claims, 3 Drawing Sheets

INDICATION DISPLAY UNIT FOR VEHICLES

This application is a continuation of application Ser. No. 262,376 filed Oct. 25, 1988 now abandoned.

BACKGROUND OF THE INVENTION

1. Field of the Invention

The present invention relates to an indication display unit for displaying velocity, revolution frequency or the like in vehicles, and more particularly to a display unit equipped with a reflecting means located in front of a driver seat that reflects the image projected from an indication projector, so that the driver can catch sight of its virtual image therebehind.

2. Description of the Prior Art

Conventionally, various indication display units for vehicles provided with a head-up display (HUD) comprising an indication projector including a display device at the ceiling of a vehicle and a reflecting means in front of a driver seat have been introduced so far due to the fact that there are more requirements for space for the installation of many kinds of indicators in vehicles.

In the indication display unit of this kind, there is the one that uses a semi-translucent mirror as a reflecting means by which the indicating image on a display device disposed therebehind and the same projected from a display device located at the ceiling and then reflected on a reflecting means can be selectively displayed so that the driver can sight one or both of them depending on his intention (Japanese Patent No. 60-20579).

However, since the semi-translucent mirror has certain degree of transmissivity and reflectivity, neither the optimum transmissivity nor that of reflectivity can be easily realized, and consequently, each of transmitted and reflected image has not been clearly displayed so far.

It is therefore an object of the present invention to minimize space to be occupied by the above indication display unit in vehicles so that various indications and clear displayed images thereof can be made possible.

SUMMARY OF THE INVENTION

The present invention is disclosed in order to solve the aforementioned problems, and two effective functional structures are introduced for this purpose.

The indication display unit according to the present invention comprises a reflecting means disposed in front of the driver seat for reflecting the image projected from an indication projector located at the ceiling so that the driver can catch the projected image as though it is displayed behind the reflecting means, and is characterized in that the above reflecting means is made of a liquid crystal board (hereinafter referred to as an LC board) and by changing the type and transmissivity thereof, the reflected image thereon projected from an indication projector and other images such as the one displayed by the indicators disposed behind the LC board or the one generated by the LC board itself can be respectively selected to be displayed thereon.

The present invention is divided into two individual functional structures.

In the first structure the LC board is made of one cell, and accordingly when the LC board is in the non-transmissive state. In other words, when it is in the on state, the image projected from the indication projection is inclined to be totally reflected, and when in the transmissive state (i.e., when it is in the off state), the direct image from the indicator located behind the LC board is inclined to be sighted therethrough instead of the above reflected indicating image.

In the second structure the LC board is of a dot-matrix type, and accordingly the image projected to the LC board from the indication projector is intensified in the non-transmissive portion thereof, and the direct image displayed by the LC board itself is intensified in other portions thereof.

DETAILED DESCRIPTION OF THE EMBODIMENTS

Figure 1:
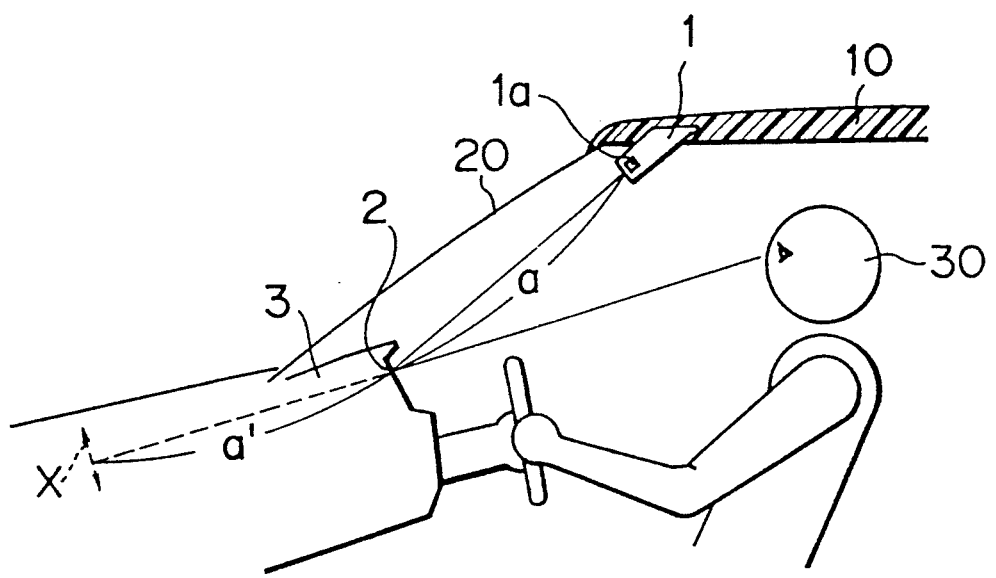
FIG. 1 is a perspective view showing the location of each device according to the present invention.
Figure 2:
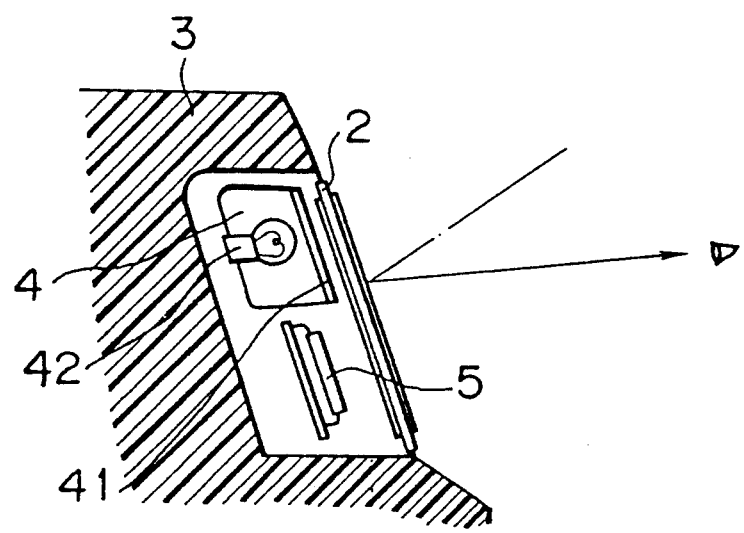
FIG. 2 shows an LC board and a dashboard in the first functional structure of the present invention.

FIG. 1 shows the location of each device, and FIGS. 2 and 3 show the first functional structure of the indication display unit for vehicles according to the present invention.

In FIG. 1, an indication projector 1 that stores a display device 1a is fixed at the ceiling 10 above the driving seat, and an LC board 2 is disposed on the panel mounted on top of a surface of the dashboard 3 in front of the windshield 20.

The display device 1a inside the indication projector 1 indicates information about high speed etc. and its indicating image is projected on the LC board 2 so that the driver can sight the projected image reflected thereby. Thus, the image projected from the display device 1a appears as a virtual image X behind the LC board 2 at the distance a' which is equal to that between the display device 1a and the panel surface. The driver 30 sights this virtual image X.

FIG. 2 shows the dashboard 3 and the LC board 2 on the panel surface. The LC board interferes or transmits the light by on/off operation of the energized voltage which is supplied from a circuit (not shown). When the LCD inside the LC board 2 becomes non-transmissive state, the reflected image thereon projected from the projector 1 can be sighted. In the dashboard 3, an alarm indicator 4 composed of a pattern mask 41 such as an alarm indication etc., a lamp 42 and a fluorescent tube 5 for clock indication are mounted.

Figure 3A:
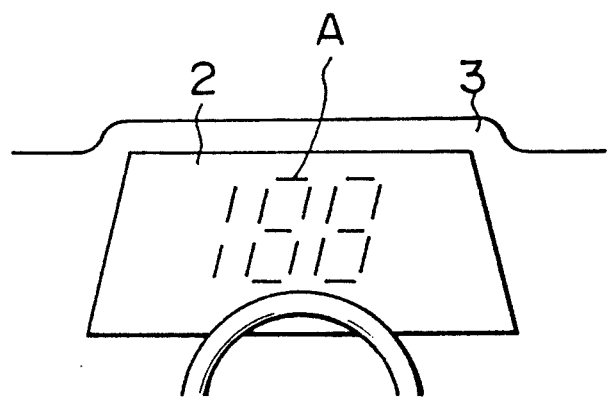
FIGS. 3a, 3b and 3c show an example of the displayed image in the first functional structure of the present invention.

FIG. 3 shows an example of the displayed image on the panel surface. As shown in FIG. 3(a), when the vehicle is moving, the LC board 2 becomes on state and the speed indication [188] A of the indication projector 1 is displayed thereon.

Figure 3B:
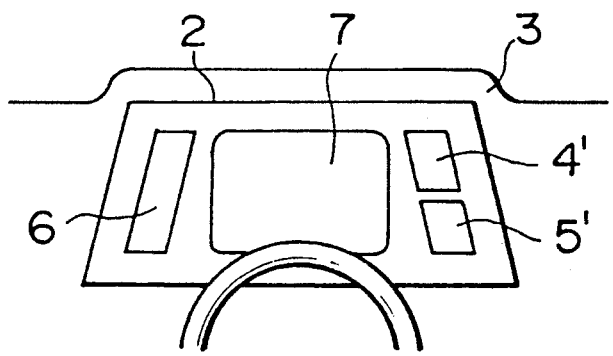

On the other hand, when the vehicle is not in the moving state, the LC board 2 becomes in the transmissive state as shown in FIG. 3(b), so that various indicators located therebehind can be directly sighted. In the same figure, a CRT display 7 for indicating various information concerning navigation, an LCD display 6 of the dot-matrix type for indicating fuel quantity are also shown apart from the displaying surface 5' of the fluorescent tube 5 and also the surface 4' of the alarm indicator 4.

Figure 3C:
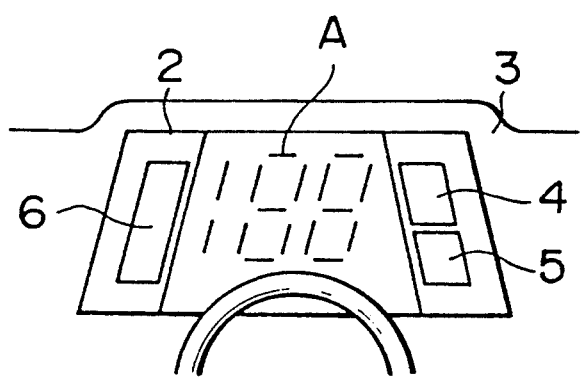

In the above structure, only the vehicle speed indication as a minimum requirement can be shown by on/off switching operation of the whole LC board 2 in its moving state. However, as shown in FIG. 3(c), apart from this speed indication, the image displayed on the display surface 4' of the alarm indicator 4, on the display surface 5' of the fluorescent tube 5 and on the LCD display 6 of the dot-matrix type can also be sighted even in its moving state by changing the electrode pattern of the LC board 2 in the predetermined part thereof. By the way, the displayed image in the above case can be easily changed to those shown in FIGS. 3(a) and 3(b).

Figure 4:
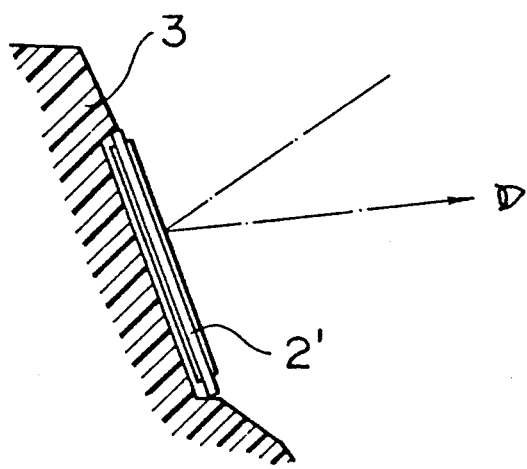
FIG. 4 shows an LC board of a dot-matrix type that generates an indicating image by itself and a dashboard in the second functional structure.
Figure 5:
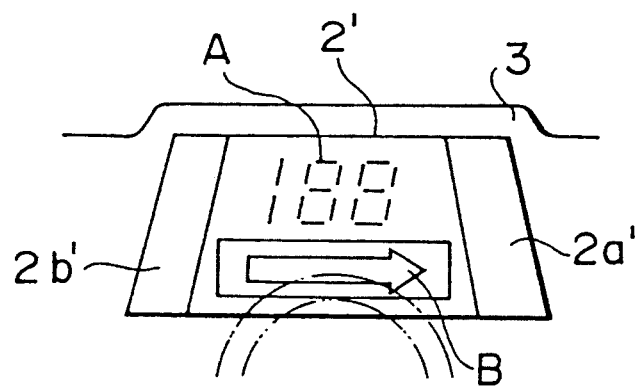
FIG. 5 shows an example of the displayed image in the second functional structure.

FIG. 4 shows the second functional structure in which a dot-matrix type LC board (LC board that generates indicating image itself) is adopted, and FIG. 5 shows an example of this displayed image in the above embodiment in which the reflecting board itself has a display function.

Since the dot-matrix type LC board 2' can change its on/off state per each dot individually, the part in the on state can be used as a reflecting surface as shown in FIG. 5 for displaying the image projected from the indication projector 1 such as a speed indication A etc. while in the on-state part thereof a dotted image such as B generated by itself can be displayed at the same time.

As explained above, when the displaying function is given to the reflecting means (a dot-matrix type LC board 2'), more space can be made for other indications inside the dashboard 3' as shown in FIG. 4.

Furthermore, even in the above second functional structure, other indicators can also be mounted behind the dot-matrix type LC board 2' so as to provide the direct image therefrom in the parts 2a' and 2b' which are in the off state as shown in FIG. 3(c). It should be noted that in the above situation no indicator should be mounted behind the part of the surface where a figure or a letter such as B is to be displayed.

As shown above, since the present invention adopts an LC board as a reflecting means, the transmissive rate thereof can be changed, so that the clearance of the displayed image is greatly improved compared with the conventional display unit which uses a semi-translucent mirror as its reflecting means.

Furthermore, since the reflecting board itself has a display function in the second structure, other indicators therebehind are not required in the normal state.

Apart from the dot-matrix type LC board, a display whose electrode pattern is preset such as a segment type display can also be used.

Figure 6A:
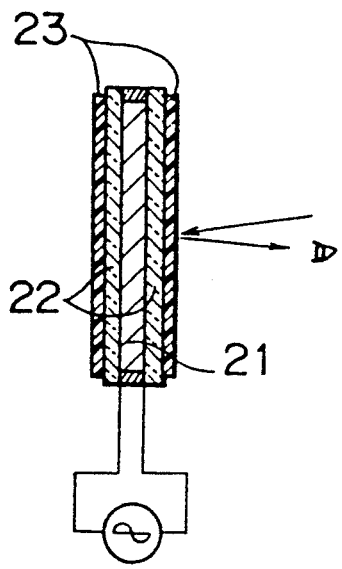
FIGS. 6a and 6b show two examples of the two LC board setting modes in the second functional structure.

The LC board used in the above second functional structure can be of the two modes; the TN mode (twisted nematic mode), and the guest-host mode. In the TN mode, as shown in FIG. 6(a) the LC board 21 and its electrodes are interposed by the two transparent glasses 22, on each of the surfaces of which a polarizing board 23 is respectively disposed.

Figure 6B:
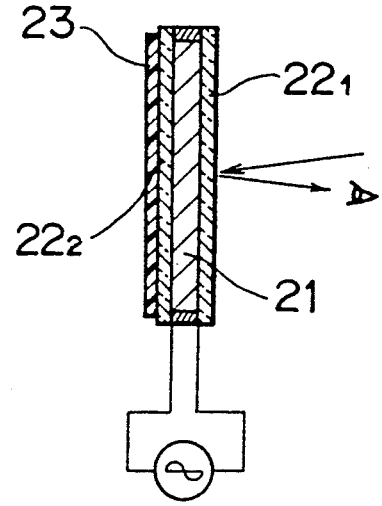

In the guest-host mode, as shown in FIG. 6(b) the LC board is interposed by two transparent glasses 221 and 222, and a polarizing board 23 is disposed on the surface of the above transparent glass 222 which is on the opposite surface to the reflecting surface. In this mode, the reflective rate of the reflecting surface of a transparent glass 221 can be freely settled by coating operation thereon.

While the invention has been particularly shown and described in reference to preferred embodiments thereof, it will be understood by those skilled in the art that changes in form and details may be made therein without departing from the spirit and scope of the invention.

What is claimed is:

1. An indication display unit for vehicles enabling a driver to sight at least one of a first indicting image and a second indicating image, comprising:
    an image projection means for projecting said first indicating image, said image projection means including a display device; and
    a reflecting means, having a front side facing a driver seat and a back side, located in front of the driver seat for receiving and reflecting said first indicating image being projected by said image projection means from said front side of said reflecting means, said reflecting means being made of a liquid crystal display which is transparent when in an off state to thereby permit said driver to sight said second indicating image located in said back side of said reflecting means.

2. An indication display unit for vehicles as claimed in claim 1, wherein said reflecting means is made of a dot-matrix type liquid crystal display which can also generate an image to be reflected therefrom.

3. An indication display unit for vehicles as claimed in claims 1 or 2, wherein at least one indicating device is disposed behind said reflecting means.

4. An indication display unit for vehicles as claimed in claims 1 or 2, wherein the transmissivity of said reflecting means can be changed depending on an on/off state of said liquid crystal display so that the transmissivity level of said indicating image can be adjusted.

5. An indication display unit for vehicles as claimed in claims 1 or 2, wherein said liquid crystal display comprises different segments of electrode patterns, wherein different images can be observed on or through said display.

6. An indication display unit for vehicles enabling a driver to sight at least one of a first indicating image and a second indicating image, comprising:
    an image projection means for projecting said first indicating image, said image projection means including a display device; and
    a reflecting means, having a front side facing a driver seat and a back side, located in front of the driver seat for receiving and reflecting said first indicating image being projected by said image projection means from said front side of said reflecting means, said reflecting means being made of a liquid crystal display which is transparent when in an off state to thereby permit said driver to sight said second indicating image located in said back side of said reflecting means, wherein said reflecting means is made of a dot-matrix type liquid crystal display which can also generate an image to be reflected therefrom.

* * * * *